Nov. 12, 1935.    G. L. TINKHAM    2,021,119
METHOD OF MAKING PRESSURE CARTRIDGES
Original Filed June 22, 1934
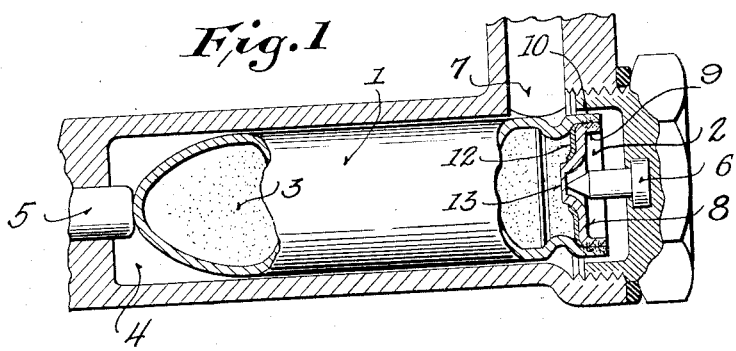
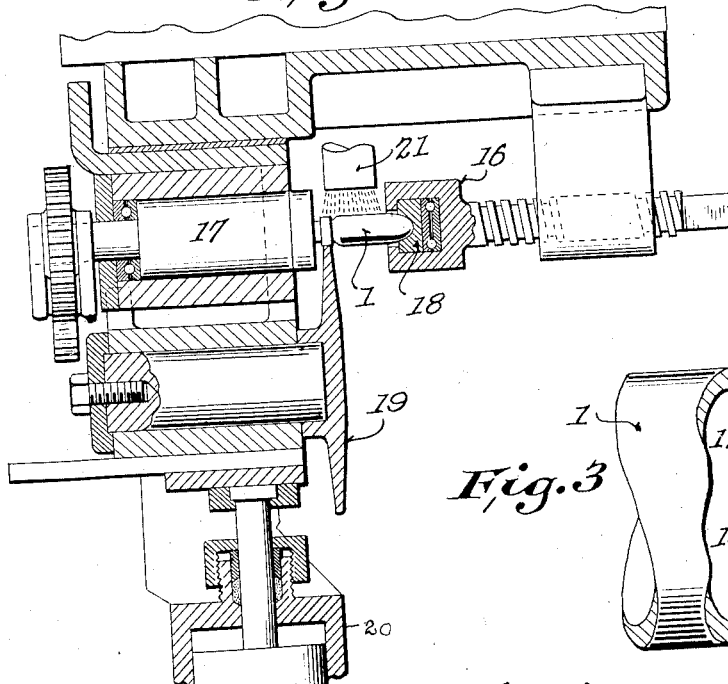
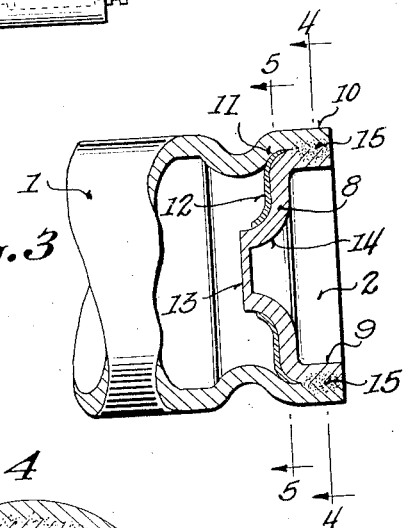
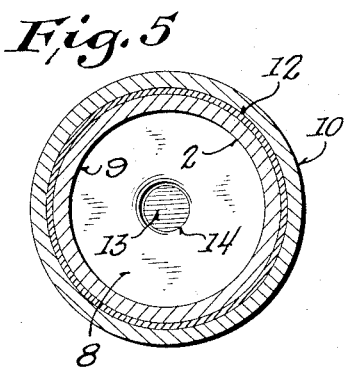
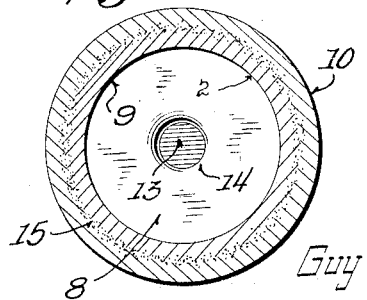
INVENTOR.
Guy L. Tinkham
BY
ATTORNEYS Patented Nov. 12, 1935

2,021,119

UNITED STATES PATENT OFFICE 2,021,119

METHOD OF MAKING PRESSURE CARTRIDGES

Guy L. Tinkham, Detroit, Mich., assignor to McCord Radiator & Mfg. Co., Detroit, Mich., a corporation of Maine Original application June 22, 1934, Serial No. 731,795. Divided and this application December 8, 1934, Serial No. 756,581

5 Claims. (Cl. 219—10)

This invention relates to pressure cartridges of the type containing an internal pressure charge which is released on puncturing the cartridge. These cartridges are used to generate a pressure at the instant desired. Cartridges of this character are employed in manually operable fire extinguishers and other devices requiring a forceable discharge of liquid when in use.

Difficulty has been encountered heretofore in providing an effective seal between the closure cap and the shell of the cartridge to prevent the leakage of the internal pressure. These cartridges to be effective must be kept potent until used and the seals heretofore employed have not been effective for this purpose, especially when the cartridges are kept for any considerable length of time which frequently occurs in connection with fire extinguisher devices.

The general object and purpose of the invention of the present application, which is a division of my co-pending application, Serial No. 731,795, filed June 22, 1934, is to provide a method whereby an effective seal between the closure cap and the shell of the cartridge may be obtained by a welding operation preferably by electric welding.

In carrying out my improved method I press and hold the cap in tight closing relation with the shell with a gasket between the cap and the shell to seal the joint between them while welding the cap to the shell and then weld the cap to the shell beyond the gasket to provide a welded seal between the cap and the shell. The welding is performed electrically by having the cap and the shell engaged with electrodes in a welding current. To secure a continuous welded connection between the cap and the shell about the same, the cap and the shell while pressure together are revolved with respect to the electrode at the cap or the electrode may be revolved about the shell for the same purpose.

Also in carrying out my improved method I subject the shell during the welding operation to a coolant to maintain the internal pressure charge in the shell at a safe working pressure.

In the accompanying drawing:

Fig. 1 is a longitudinal sectional view with parts in elevation of a pressure cartridge shown in its place of use in a manually operable fire extinguisher device and having its closure cap welded to the shell of the cartridge by the method of my invention;

Fig. 2 is a sectional view with parts in elevation of a form of apparatus which may be employed for electrically welding the cap to the shell after the pressure charge has been placed in the shell in accordance with the method of my invention;

Fig. 3 is an enlarged sectional view taken through the cartridge at the cap to show the welded connection; and Figs. 4 and 5 are transverse sectional views taken on lines 4—4 and 5—5, respectively, of Fig. 3.

As shown in the drawing, the cartridge has a one piece metal body or shell 1 drawn to the shape and length required. The shell is made with one end open, whereby the medium constituting the pressure charge may be inserted into the shell before applying the closure cap 2 to the shell. The pressure charge, which is marked 3 in Fig. 1, preferably comprises solid carbon dioxide.

In Fig. 1, I have shown the cartridge located in a chamber 4 of a fire extinguisher device of the pistol grip type of the character disclosed in my co-pending application Serial No. 654,606, filed February 1, 1933, now Patent No. 1,988,637, granted January 22, 1935. In operation of this device a plunger 5 moves the cartridge against a puncturing pin 6. The latter punctures the cap 2 to liberate the pressure charge from the cartridge. The cartridge is arranged in the chamber 4 with its closure cap 2 at the pin and its opposite end at the plunger. The plunger is projected against the cartridge by the trigger mechanism (not shown) with which the extinguisher device is provided. A passage 7 connects the chamber 4 with the reservoir (not shown) of the extinguisher. This reservoir is in the form of a metal container mounted on the extension having the passage 7 and contains a supply of the fire extinguishing fluid such as carbon tetrachloride. This fluid is discharged from the reservoir with considerable force through the nozzle of the extinguisher on the release of the pressure charge from the cartridge. Opening the discharge valve to the nozzle and puncturing the cartridge is performed at or about the same time through the actuation of the trigger mechanism.

The cap 2 is also drawn from sheet metal into cup form. This gives the cap a bottom wall 8 and a surrounding marginal wall 9. The cap fits within and closes the open end of the shell 1 with the marginal wall 9 of the cap against the adjacent portion 10 of the shell wall. A shoulder 11 in the shell at the inner end of the wall portion 10 provides a seat for the cap and also for a metal gasket 12 which seals the joint between the shell and the cap while welding the cap to the shell in accordance with my invention. The gasket is in annular form so that the seal which it provides is continuous about the cap, as shown in Fig. 5. The gasket may be of stainless steel or other desired metal and is apertured at its center so that a portion of the cap wall 8, to be presently described, may be directly exposed to the pressure charge within the shell. The shoulder 11 is preferably formed by pressing the shell wall inwardly as shown. The cap while being tightly pressed into the shell against the gasket, is welded to the shell at the contacting walls 9 and 10 to provide a welded seal between the cap and the shell, which seal effectively prevents leakage of pressure from the cartridge and retains the latter potent until used.

The bottom wall 8 of the cap has its central portion reduced in thickness as at 13 whereby the pin 6 under a pressure of between eleven to fifteen pounds may puncture the cap to release the internal pressure from the cartridge. The thin portion 13 is produced by grinding off the metal to the thinness desired, as for example approximately .018 to an inch. The grinding operation can be localized by having the thin portion at the outer end of a protuberance 14 pressed outwardly from the bottom wall of the cap. In practice the protuberance is drawn to approximately the thickness of the metal of the cap and made straight or flat at the portion to be ground. In the particular form of construction shown in the drawing, the protuberance is pressed outwardly from the wall 8 to the side opposite the marginal wall 9. Thus the protuberance may be reached for grinding without hindrance by the marginal wall. Also the protuberance may extend into the shell through the gasket and be directly exposed to the pressure charge in the shell. While the puncturing section shown in the drawing is applied to the cap, it is to be understood that it is within the contemplation of my invention to provide the puncturing section in the shell wall, as at the end of the shell opposite the cap, in which event the cartridge would be reversely arranged in the chamber 4.

In securing the cap to the shell, after the pressure charge has been placed in the shell, the cap is pressed into the shell toward the shoulder 11. Sufficient pressure is applied to tightly seat the gasket against the shoulder. While the cap is so held, the marginal wall 9 of the cap is electrically welded completely about the same to the wall portion 10 of the shell beyond the outer edge of the gasket as indicated at 15 in Figs. 1, 3 and 4. Spot welding which overlaps is employed to provide a continuous welded connection between the cap and the shell to the full circumferential extent thereof as shown in Fig. 4. This effectively secures the cap to the shell and provide a welded seal which prevents leakage of the pressure charge from the shell.

A form of apparatus for welding the cap to the shell in accordance with my invention is shown in Fig. 2. Briefly the apparatus comprises a support 16 for the shell and a holding member 17 for the cap. This member does not fit tightly within the cap, there being sufficient clearance between the member and the marginal wall of the cap to prevent welding of the cap to the member in the welding operation. The support 16 is adjustable as shown so that the cap may be tightly forced into the shell to clamp the gasket between the cap and the shell at the shoulder 11.

The member 16 is in the form of a screw for this purpose and carries a rotatably mounted socketed portion 18 at its inner end to receive and support the closed end of the shell. The member 17 constitutes one of the electrodes of the welding apparatus. The other electrode 19 is in the form of a disc adapted to be brought into peripheral contact with the wall portion 10 of the shell for electrically welding the cap to the shell. A pressure device 20 is employed for holding the disc in contact with the shell. The disc 19 and the cap holder 17 are rotatable to secure a welding connection between the cap and the shell completely about the same as described. The disc and the cap holder are preferably rotated by power and at such speed as to quickly weld the cap to the shell without an opportunity being afforded for the heat generated in the welding operation to be transferred to the pressure charge for increasing its pressure beyond a safe working pressure. To carry off this heat and thus prevent a noticeable increase of internal pressure in the cartridge during the welding operation, I subject the exterior of the shell and also the electrodes to a suitable coolant. This may comprise a suitable liquid flowed onto the parts from one or more tubes or pipes, one of which is shown at 21 in Fig. 2.

In the welding apparatus shown, the cap holding member 17 is rotatably mounted in the frame 30 of the device and is turned by suitably arranged gearing. The socketed member 18 in being rotatably supported by the screw 16 enables the shell 1 to turn in union with the cap 2 even though the parts are tightly pressed together by the screw. The cap and the shell are made of the same metal and preferably of the same gage. The circuit for the electrodes contains an interrupter (not shown) which provides for the spot welding. The arrangement is such that the spots overlap to provide a continuous weld about the cap, and thus the sealing function of the gasket is not dependent upon to prevent leakage from the cartridge. The gasket is employed to seal the joint while the cap is being welded to the shell. The coolant may be flowed by gravity or by pressure as may be desirable.

The advantages of the invention are that the welded connection between the cap and the shell provides an effective means for securing the cap to the shell and for preventing leakage of pressure from the shell. Thus the cartridge is kept potent until used.

It is to be of course understood that the electrodes are to be suitably insulated from each other and from the machine frame and the parts which support and operate them.

I claim as my invention:

1. The method of securing a closure cap to the shell of a pressure cartridge of the character described, consisting in pressing the cap into closing relation with respect to the shell with a gasket between the cap and the shell to seal the joint between them while welding the cap to the shell, and then welding the cap to the shell to provide a welded seal between the cap and the shell.

2. The method of securing a cup shaped closure cap to the shell of a pressure cartridge of the character described, consisting in forcing the cap into the shell with a gasket between the cap and the shell to seal the joint between them while welding the cap to the shell, and while holding the cap against the gasket and in tightly clamped relation with respect to the shell, welding the contacting walls of the cap and the shell together beyond the gasket to provide a welded seal between the cap and the shell.

3. The method of securing a closure cap to the shell of a pressure cartridge of the character described, consisting in pressing the cap into closing relation with respect to the shell with a gasket between the cap and the shell to seal the joint between them while welding the cap to the shell, and while holding the cap under pressure against the gasket and in contact with the shell, subjecting the cap and the shell to an electrical welding current to electrically weld the cap to the shell.

4. The method of securing a closure cap to the shell of a pressure cartridge of the character described, consisting in pressing the cap into closing relation with respect to the shell with a gasket between the cap and the shell to seal the joint between them while welding the cap to the shell, and while holding the cap tightly pressed against the gasket and in contact with the shell, revolving the cartridge and subjecting the same to an interrupted electrical welding current to weld the cap to the shell with a continuous welded connection between the cap and the shell about the same.

5. The method of securing a closure cap to the shell of a pressure cartridge of the character described, consisting in pressing the cap into closing relation with respect to the shell, holding the cap closed on the shell and subjecting the same to an electrical welding current to weld the cap to the shell, and during the welding operation subjecting the cap and the shell to a coolant by spraying a coolant on the exterior of the cartridge to maintain the internal pressure charge in the shell at a safe working pressure.

GUY L. TINKHAM.